(12) United States Patent
Challa

(10) Patent No.: US 7,436,412 B2
(45) Date of Patent: Oct. 14, 2008

(54) GRAPHICS ENGINE WITH EFFICIENT INTERPOLATION

(75) Inventor: Raghu Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 11/211,939

(22) Filed: Aug. 24, 2005

(65) Prior Publication Data

US 2007/0046692 A1    Mar. 1, 2007

(51) Int. Cl.
G09G 5/00 (2006.01)
G09G 5/02 (2006.01)
G06K 9/32 (2006.01)
G06T 11/40 (2006.01)

(52) U.S. Cl. .................. 345/606; 345/586; 345/643; 382/300; 348/538

(58) Field of Classification Search .............. 345/418, 345/581–582, 586, 639–644, 501; 382/285, 382/300; 358/525; 348/538, 646, 651, 720
See application file for complete search history.

(56) References Cited

U.S. PATENT DOCUMENTS 6,771,264 B1 * 8/2004 Duluk et al. ............... 345/426

| | | | |
|---|---|---|---|
| 2003/0076331 A1 | 4/2003 | Deering | |
| 2003/0086007 A1 * | 5/2003 | Sasai | 348/240.2 |
| 2006/0268005 A1 * | 11/2006 | Hutchins et al. | 345/606 |
| 2007/0130401 A1 * | 6/2007 | Baker et al. | 710/62 |

FOREIGN PATENT DOCUMENTS

EP    1061436 A2    12/2000
EP    1473676 A2    11/2004

* cited by examiner

*Primary Examiner*—Wesner Sajous
(74) *Attorney, Agent, or Firm*—Matthew J. Evans; Kyong H. Macek; Thomas R. Rouse (57) ABSTRACT

A graphics engine includes a setup unit and a rendering unit. The setup unit computes coefficients A, B, and C used for interpolating an attribute v of a triangle to be rendered for a graphics image. The setup unit then derives compressed coefficients Ã, B̃, and C̃ based on the coefficients A, B, and C. The compressed coefficients have a fixed-point format with R integer bits left of a binary point and T fractional bits right of the binary point, where $R > 1$ and $T \geq 0$. R is selected based on the number of bits used for attribute v, T is selected based on the screen dimension, and R+T is much less than the number of bits used to represent the coefficients A, B, and C. The rendering unit performs interpolation for the attribute v using the compressed coefficients Ã, B̃, and C̃, and may be implemented with a simple (R+T)-bit non-saturating accumulator.

34 Claims, 7 Drawing Sheets

GRAPHICS ENGINE WITH EFFICIENT INTERPOLATION

BACKGROUND

I. Field

The present invention relates generally to electronics, and more specifically to a graphics engine.

II. Background

Graphics processors are widely used to render 2-dimensional (2-D) and 3-dimensional (3-D) images for presentation on electronics displays. A 3-D image may be modeled with surfaces, and each surface may be approximated with triangles. The number of triangles needed to represent the 3-D image is dependent on the complexity of the surfaces and the desired resolution for the image. The total number of triangles for the 3-D image may be quite large, e.g., in the millions.

A graphics processor attempts to render the triangles for 3-D images as quickly as possible. Each triangle is defined by (x, y) coordinates for the three vertices of the triangle. Each vertex of each triangle is associated with various attributes such as color, texture, depth, and so on. The graphics processor renders each triangle by interpolating each of the attributes for that triangle. For each attribute of each triangle, the graphics processor determines a proper value for that attribute at each pixel location within the triangle. The graphics processor typically achieves this by performing linear interpolation using the values given for the attribute at the three vertices of the triangle. Since a 3-D image may include many triangles and since each triangle may have many attributes, the rendering process is typically very computationally intensive.

There is therefore a need in the art for a graphics engine that can efficiently perform interpolation for graphics rendering.

SUMMARY

A graphics engine that can efficiently perform interpolation using fewer bits while achieving good accuracy is described herein. The graphics engine includes a setup unit and a rendering unit. The setup unit computes a set of coefficients A, B, and C used for interpolating an attribute v (e.g., a color component such as red, green, or blue) of a triangle to be rendered for a 3-D image. The coefficients A, B, and C may have a large dynamic range and may thus be represented with a large number of bits to achieve the desired accuracy for the interpolation results. The setup unit then derives a set of "compressed" coefficients $\tilde{A}$, $\tilde{B}$, and $\tilde{C}$ based on the set of coefficients A, B, and C. The compressed coefficients have a fixed-point format with R "integer" bits to the left of a binary point and T "fractional" bits to the right of the binary point, where $R > 1$, $T \geq 0$, and R+T may be much less than the number of bits used to represent the coefficients A, B, and C. The number of integer bits (R) may be selected based on the number of bits used for the attribute v being interpolated. R may further be selected based on the range of values for the attribute across the triangle. In addition, R typically also depends on the triangle size. The number of fractional bits (T) may be selected based on the dimension of the display screen for which the triangle is rendered. T may further be selected based on the size of the triangle. Details on the interpolation process and the derivation of the coefficients A, B, and C as well as the compressed coefficients $\tilde{A}$, $\tilde{B}$, and $\tilde{C}$ are described below.

The rendering unit performs interpolation for the attribute v using the compressed coefficients $\tilde{A}$, $\tilde{B}$, and $\tilde{C}$. The rendering unit may be implemented with a non-saturating accumulator that can efficiently perform interpolation for a scan in the horizontal or vertical direction on the display screen by accumulating the compressed coefficient $\tilde{A}$ or $\tilde{B}$, respectively. Triangle rendering is thereby greatly simplified.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
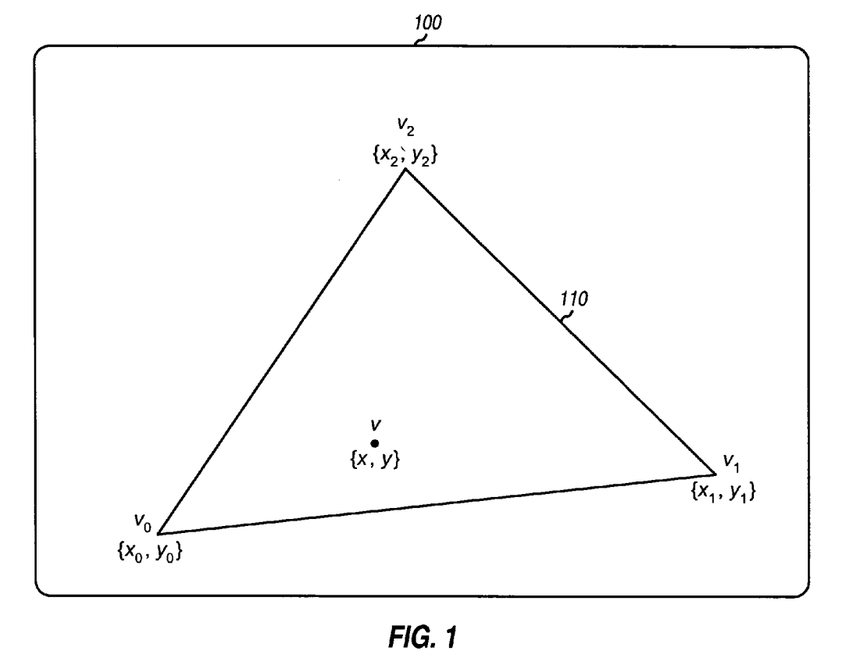
FIG. 1 shows a triangle used to model a surface of a 3-D image.

FIG. 1 shows an exemplary triangle 110 used to model a surface of a 3-D image. The triangle is to be rendered on a display screen 100. The triangle is defined by coordinates $\{x_0, y_0\}$, $\{x_1, y_1\}$, and $\{x_2, y_2\}$ for the three vertices of the triangle. The triangle is also associated with one or more attributes. These attributes may be for red, green, and blue components for diffused color (three attributes), red, green, and blue components for specular color (another three attributes), Z-depth, texture coordinates (two attributes), inverse-Z depth, and so on. For simplicity, the following description is for one attribute of the triangle. This attribute is denoted as v and has three values $v_0$, $v_1$, and $v_2$ at the three vertices of the triangle, as shown in FIG. 1. In the following description, $\{x_i\} = \{x_0, x_1, x_2\}$, $\{y_i\} = \{y_0, y_1, y_2\}$, and $\{v_i\} = \{v_0, v_1, v_2\}$.

Figure 2:
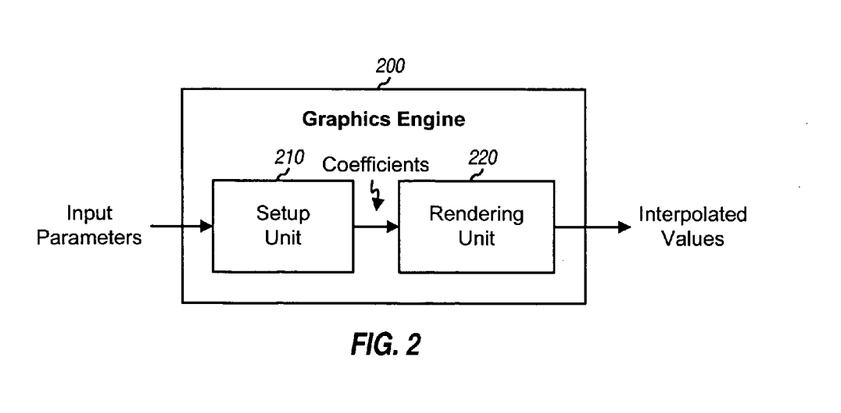
FIG. 2 shows a graphics engine capable of rendering triangles.

FIG. 2 shows a block diagram of a graphics engine 200 capable of rendering triangle 110. A setup unit 210 receives input parameters $\{x_i\}$, $\{y_i\}$, and $\{v_i\}$ for the triangle and generates coefficients used for interpolating the attribute v. A rendering unit 220 receives the coefficients and generates interpolated values for the attribute v at various locations within the triangle. Setup unit 210 executes per triangle, and rendering unit 220 executes per pixel for a given triangle. Exemplary designs for setup unit 210 and rendering unit 220 are described below. Graphics engine 200 typically includes other processing units that are not shown in FIG. 2 for simplicity.

Graphics engine 200 renders triangle 110 by filling the interior of the triangle with interpolated values for the attribute v. For a direct evaluation method, the attribute value at any {x, y} location within the triangle may be derived based on the following interpolation equation:

$$v = A \cdot x + B \cdot y + C, \qquad \text{Eq(1)}$$

where A, B, and C are interpolation coefficients, which may be generated as described below. Graphics engine 200 computes interpolated values for all locations within the triangle using equation (1). In the following description, the term "variables" can generically refer to input parameters (e.g., $\{x_i\}$, $\{y_i\}$, and $\{v_i\}$), coordinates (e.g., x and y), coefficients (e.g., A, B, and C), intermediate values, and final result (e.g., v).

The coefficients A, B, and C may be obtained from the following set of three equations for the attribute v:

$$v_0 = A \cdot x_0 + B \cdot y_0 + C,$$

$$v_1 = A \cdot x_1 + B \cdot y_1 + C, \text{ and}$$

$$v_2 = A \cdot x_2 + B \cdot y_2 + C. \qquad \text{Eq(2)}$$

Each equation in equation set (2) is obtained by applying input parameter values $x_i$, $y_i$, and $v_i$ for a given vertex i, where i=0, 1, 2, to equation (1). Equation set (2) indicates that each attribute is associated with a different set of coefficients.

Equation set (2) may be expressed in matrix form as follows:

$$\begin{bmatrix} v_0 \\ v_1 \\ v_2 \end{bmatrix} = \begin{bmatrix} x_0 & y_0 & 1 \\ x_1 & y_1 & 1 \\ x_2 & y_2 & 1 \end{bmatrix} \cdot \begin{bmatrix} A \\ B \\ C \end{bmatrix}. \qquad \text{Eq (3)}$$

The coefficients A, B, and C may then be computed as follows:

$$\begin{bmatrix} A \\ B \\ C \end{bmatrix} = \begin{bmatrix} x_0 & y_0 & 1 \\ x_1 & y_1 & 1 \\ x_2 & y_2 & 1 \end{bmatrix}^{-1} \cdot \begin{bmatrix} v_0 \\ v_1 \\ v_2 \end{bmatrix}. \qquad \text{Eq (4)}$$

A matrix M may be defined as follows:

$$M = \begin{bmatrix} x_0 & y_0 & 1 \\ x_1 & y_1 & 1 \\ x_2 & y_2 & 1 \end{bmatrix}. \qquad \text{Eq (5)}$$

The inverse of matrix M, or $M^{-1}$, may be computed as follows:

$$M^{-1} = \frac{1}{det(M)} \cdot M_C^T = D \cdot M_C^T, \qquad \text{Eq (6)}$$

where det (M) is a determinant of matrix M, $M_C$ is a companion matrix of matrix M, D is a variable that is equal to one over the determinant (i.e., the reciprocal of the determinant), and "$T$" denotes a transpose. The determinant of the matrix M is equal to the area of the triangle and may be computed as follows:

$$det(M) = |M| = x_1 y_2 + x_2 y_0 + x_0 y_1 - x_2 y_1 - x_0 y_2 - x_1 y_0. \qquad \text{Eq(7)}$$

The companion matrix $M_C$ may be expressed as follows:

$$M_C = \begin{bmatrix} a_0 & b_0 & c_0 \\ a_1 & b_1 & c_1 \\ a_2 & b_2 & c_2 \end{bmatrix} = \begin{bmatrix} (y_1 - y_2) & (x_2 - x_1) & (x_1 y_2 - x_2 y_1) \\ (y_2 - y_0) & (x_0 - x_2) & (x_2 y_0 - x_0 y_2) \\ (y_0 - y_1) & (x_1 - x_0) & (x_0 y_1 - x_1 y_0) \end{bmatrix}. \qquad \text{Eq (8)}$$

The coefficients A, B, and C may then be computed as follows:

$$\begin{bmatrix} A \\ B \\ C \end{bmatrix} = D \cdot \begin{bmatrix} a_0 & a_1 & a_2 \\ b_0 & b_1 & b_2 \\ c_0 & c_1 & c_2 \end{bmatrix} \cdot \begin{bmatrix} v_0 \\ v_1 \\ v_2 \end{bmatrix}. \qquad \text{Eq (9)}$$

Each variable may be represented as a fixed-point number or a pseudo floating-point number. A fixed-point number has the following format:

$$pp \ldots pp.qq \ldots qq, \qquad \text{Eq(10)}$$

where each "p" represents one binary "integer" bit to the left of the binary point "." and each "q" represents one binary "fractional" bit to the right of the binary point. Each integer bit represents a value of one or greater, with the exact value being determined by the location of that integer bit within the fixed-point number. Each fractional bit represents a value of less than one, with the exact value being determined by the location of that fractional bit within the fixed-point number. A fixed-point number has a predetermined number of bits, and the binary point is fixed at a specific bit position.

A pseudo floating-point number has the following format:

$$\text{Mant} \times 2^{-F}, \qquad \text{Eq(11)}$$

where Mant is a mantissa and F is an exponent value indicative of the location of the floating point for the number. A negative sign in front of the exponent value F allows for convenient representation of small floating-point numbers less than one (1.0). A floating-point number can represent a large range of values with good resolution using a fixed number of bits. However, arithmetic operations on floating-point numbers are generally much more complex than arithmetic operations on fixed-point numbers.

To simplify the evaluation of interpolation equation (1), it is desirable to represent the coefficients A, B, and C with as few bits as possible while still achieving good accuracy. The number of bits required for the coefficients A, B, and C is dependent on the number of bits used for other variables in the interpolation equation. Table 1 lists the various variables used for interpolation, their numeric formats, and exemplary bit-width for each variable for an exemplary design.

TABLE 1

| Variable | Format | Example | Format Description |
|---|---|---|---|
| $x_i$, $y_i$ | P.Qu | 10.6 u | Unsigned fixed-point number with P integer bits and Q fractional bits. |
| x, y | P.0u | 10.0 u | Unsigned fixed-point number with P integer bits and zero fractional bits. |
| $v_i$, v | R.Su | 16.0 u | Unsigned fixed-point number with R integer bits and S fractional bits. |

TABLE 1-continued

| Variable | Format | Example | Format Description |
|---|---|---|---|
| D | F, M | [6 31], 12 | Pseudo floating-point number with M bits for the mantissa and an exponent value of F. |
| Ã, B̃, C̃ | R.Ts | 16.12 s | Signed fixed-point number with R integer bits and T fractional bits. |

The coefficients Ã, B̃, and C̃ are compressed representations of the coefficients A, B, and C, respectively, and are described in detail below.

The determinant of the matrix M is equal to the area of the triangle and may be represented with a fixed-point number having a 2P.Qu format (or 2P+Q bits). The variable D is equal to one over the determinant and may be represented with a fixed-point number having a Q.Ku format, where $K \geq 2P$. If $x_i$ and $y_i$ have a 10.6 u format, then the variable D may be represented in a 6.Ku format with $K \geq 20$.

The variable D may be more efficiently represented using the pseudo floating-point representation. The variable D may be derived and initially represented in a fixed-point format, e.g., in a 6.(2P+M)u format, with K=2P+M. The pseudo floating-point representation for the variable D may then be determined by taking the fixed-point representation for the variable D, scanning from the leftmost bit of the fixed-point representation until the first "1" bit is encountered, keeping this first encountered "1" bit and the next M−1 bits, and discarding all other bits. The mantissa is equal to the M bits retained from the fixed-point representation for the variable D. For the pseudo floating-point representation, the mantissa includes M integer bits and has a format of: 1 mm . . . mm, where each "m" can have a value of either "0" or "1". The floating point F is the position of this first "1" moving from the LSB to the MSB. The exponent value F ranges from M−6 to M+2P−1 if the variable D has the 6.(2P+M)u format.

Figure 3:
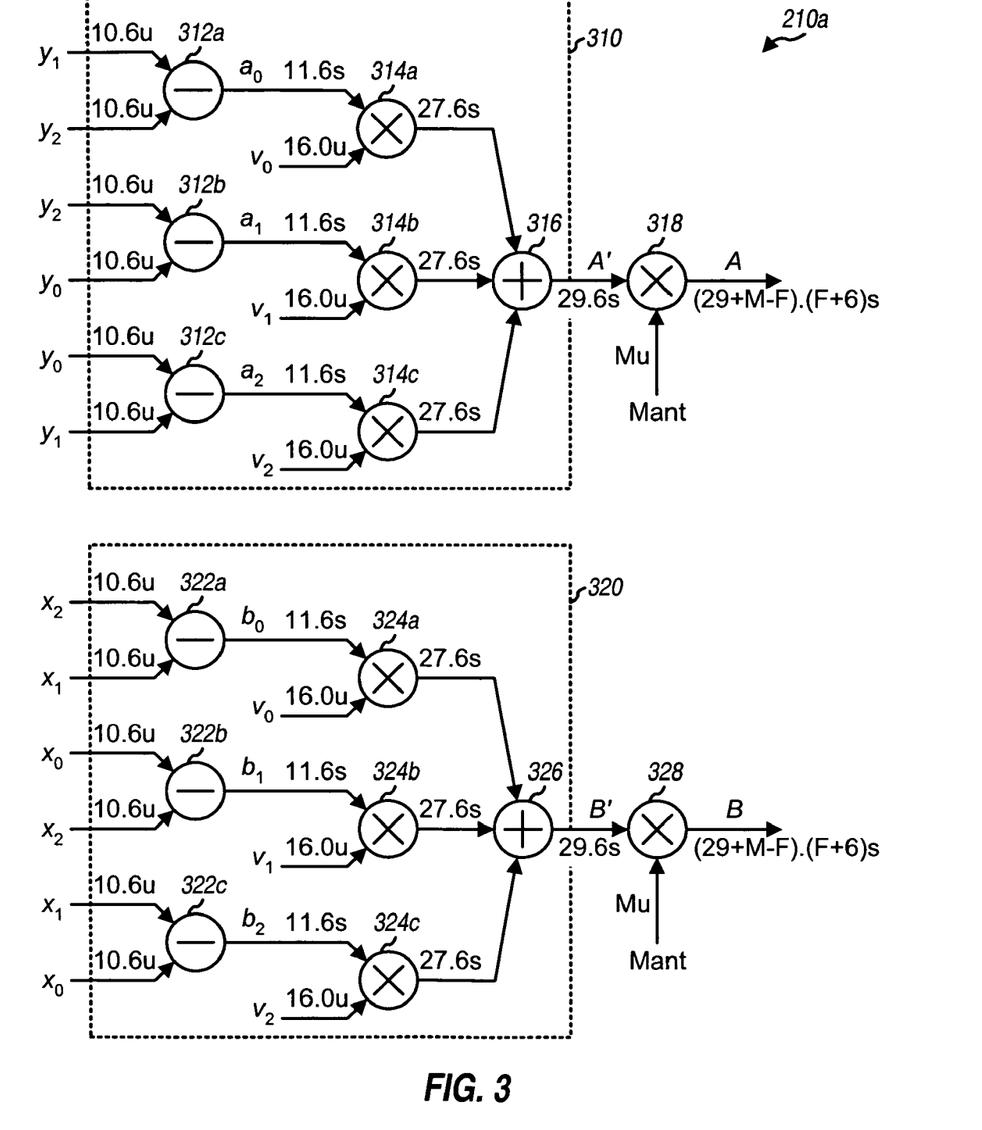
FIG. 3 shows a setup unit within the graphics engine.

FIG. 3 shows the computation performed by a setup unit 210a to derive the coefficients A, B, and C using pseudo floating-point representation for the variable D. Setup unit 210a is an embodiment of setup unit 210 in graphics engine 200 in FIG. 2. To derive the coefficient A, the variables $\{a_i\}=\{a_0, a_1, a_2\}$ in the companion matrix $M_C$ are first computed based on the input parameter values $\{y_i\}$ in blocks 312a through 312c, as shown in equation (8). The variables $\{a_i\}$ are then multiplied with the attribute values $\{v_i\}$ in blocks 314a through 314c. The outputs of blocks 314a through 314c are combined in block 316 and further multiplied in block 318 with the mantissa for the variable D, as indicated in equation (9), to generate the coefficient A.

The coefficient B may be derived in similar manner as the coefficient A, albeit with the input parameter values $\{x_i\}$ and the attribute values $\{v_i\}$. The variables $\{b_i\}=\{b_0, b_1, b_2\}$ in the companion matrix $M_C$ are first computed based on the input parameter values $\{x_i\}$ in blocks 322a through 322c, as shown in equation (8). The variables $\{b_i\}$ are then multiplied with the attribute values $\{v_i\}$ in blocks 324a through 324c. The outputs of blocks 324a through 324c are combined in block 326 and further multiplied in block 328 with the mantissa for the variable D to generate the coefficient B.

To derive the coefficient C, the variables $\{c_i\}=\{c_0, c_1, c_2\}$ in the companion matrix $M_C$ are first computed based on the input parameter values $\{x_i\}$ and $\{y_i\}$ in blocks 352a-352f, 354a-354f, and 356a-356c, as shown in equation (8). The variables $\{c_i\}$ are then multiplied with the attribute values $\{v_i\}$ in blocks 358a through 358c. The outputs of blocks 358a through 358c are combined in block 360 and further multiplied in block 362 with the mantissa for the variable D to generate the coefficient C.

FIG. 3 also shows the bitwidths for various variables for the exemplary design shown in Table 1. For this design, the input parameters $\{x_i\}$ and $\{y_i\}$ have a 10.6 u format, and the input parameter $\{v_i\}$ has a 16.0 u format. The following basic rules are used to determine the bitwidths for the intermediate and final results in the computation for the coefficients A, B, and C:

1. Addition or subtraction of two numbers produces an output having an extra bit;
2. Multiplication of two numbers produces an output having the number of bits equal to the sum of the bits in the two input numbers;
3. Truncation operation (denoted as ">>") drops a certain number of least significant bits (LSBs); and
4. Saturation operation (denoted as "SAT") performs a maximum (MAX) and/or minimum (MIN) operation to limit the number of most significant bits (MSBs).

FIG. 3 indicates that the coefficients A and B may each be represented with 35+M bits, and the coefficient C may be represented with 45+M bits. In general, the coefficient C requires P more bits than the coefficients A and B for the reason described below. The worst-case (or biggest) bitwidths for coefficients A, B, and C may be specified using the biggest value of M.

Figure 4:
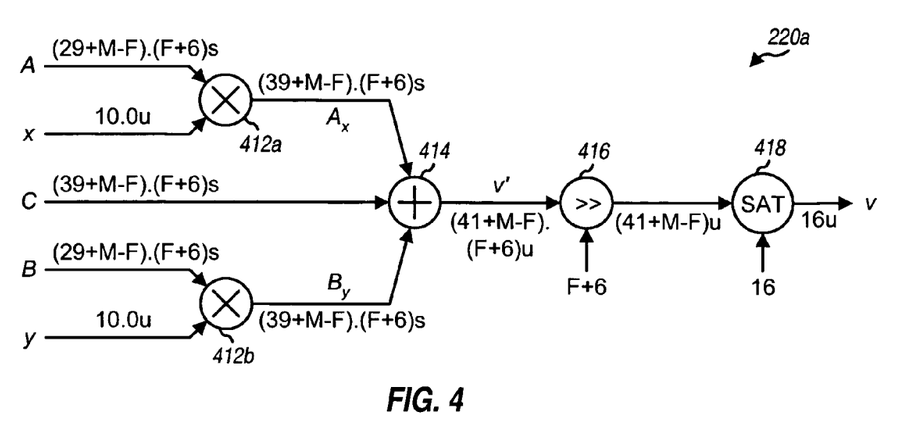
FIG. 4 shows a rendering unit within the graphics engine.

FIG. 4 shows the computation performed by a rendering unit 220a to generate interpolated values for the attribute v. Rendering unit 220a is an embodiment of rendering unit 220 in graphics engine 200 in FIG. 2. Rendering unit 220a receives the coefficients A, B, and C from setup unit 210a in FIG. 3. The variables x and y for a location to be interpolated within the triangle are multiplied with the coefficients A and B, respectively, in blocks 412a and 412b to generate intermediate values $A_x$ and $B_y$, respectively. The intermediate values $A_x$ and $B_y$ are summed with the coefficient C in block 414 to generate a preliminary result v'. The preliminary result v' is right-shifted by F+6 bit positions in block 416 to account for the pseudo floating-point representation of the variable D. The shifted value is then saturated in block 418 to R bits, which is the number of integer bits for the attribute v.

FIG. 4 also shows the bitwidths for various variables for the exemplary design shown in Table 1. The basic rules described above are applied to each operation. FIG. 4 indicates that the intermediate values $A_x$ and $B_y$ may each be represented with 45+M bits, which is the number of bits used for the coefficient C. The variables x and y for the screen coordinates supply the 10 additional bits to the coefficients A and B so that the intermediate values $A_x$ and $B_y$ match the bitwidth of the coefficient C. The preliminary result v' has 47+M bits, and the final result for the attribute v has 16 bits.

In FIG. 4, the bitwidths of the coefficients A, B, and C, the intermediate values $A_x$ and $B_y$, and the preliminary result v' are all given in terms of M, which is the number of bits for the mantissa of the variable D. A larger mantissa size M provides better accuracy for the variable D and the interpolated value for the attribute v but also requires more bits for the interpolation. A tradeoff may be made between the bitwidth of the mantissa and performance. Different mantissa sizes may be evaluated (e.g., using computer simulation) to determine the extent of errors generated with each different mantissa size. The smallest mantissa size with the desired performance may then be selected for use. An exemplary computer simulation shows that M=12 bits for the mantissa produce good results. However, other mantissa sizes may also be used.

Referring back to FIG. 4, for M=12, the coefficients A and B may each be represented with 47 bits using a (41−F).(F+6)u format, and the coefficient C may be represented with 57 bits using a (51−F).(F+6)u format. The intermediate values $A_x$ and $B_y$ may each be represented with 57 bits using a (51−F).(F+6)u format. The preliminary result v' may be represented with 59 bits using a (53−F).(F+6)u format. Of the 59 bits for the preliminary result v', F+6 LSBs are for the fractional portion and are truncated, and 53−F−16 MSBs are for the integer portion and are saturated to obtain the final 16 bits for the attribute v. For the exemplary design shown in Table 1, the exponent value F can range from 6 to 31, or F=[6 31]. In this case, 12 to 37 bits are truncated and 31 to 6 bits are saturated to obtain the final result for the attribute v. The specific number of bits to be truncated and the specific number of bits to be saturated are dependent on the determinant of the matrix M, i.e., the size of the triangle to be rendered.

The actual interpolation is typically implemented with an accumulator having a size that is as big as the coefficient C. For high-speed rendering, many (e.g., dozens of) such accumulators are typically implemented, one for each of the many attributes being rendered, which costs hardware. Often times, the accumulators are run in parallel, which costs power. The innovative graphic engine described herein can provide substantial savings in terms of both hardware and power.

A large reduction in the number of bits used for interpolation, and hence a dramatic reduction in complexity, may be achieved by exploiting the following observations:

1. A fixed number of fractional bits may be used for the coefficients A, B, and C because the input parameters x and y are constrained due to a fixed screen size.
2. A fixed number of integer bits may be used for the coefficients A, B, and C because the attribute v to be interpolated is constrained to be within a range of values.

The fixed and smaller bitwidths for the coefficients A, B, and C reduce the bitwidths of the intermediate results in the interpolation process and further simplify computation.

The number of fractional bits for the coefficients A, B, and C may be reduced based on screen dimensions and further selected based on the desired resolution/accuracy for the interpolated values for the attribute being rendered. Referring back to interpolation equation (1), the coefficient A may be viewed as an incremental change in the attribute v along the x-axis (e.g., horizontal direction), and the coefficient B may be viewed as an incremental change in the attribute v along the y-axis (e.g., vertical direction). For a screen size of P bits in the horizontal direction, the variable x can take on values of 0 to $2^P-1$. To capture the smallest change of one LSB in the attribute v across the entire range of x values, the coefficient A should have at least P fractional bits. Similarly, for a screen size of P bits in the vertical direction, the coefficient B should have at least P fractional bits in order to capture the smallest change of one LSB in the attribute v across the entire range of y values. Furthermore, since the intermediate values $A_x=A\cdot x$ and $B_y=B\cdot y$ may be represented with P fractional bits, the coefficient C may also be represented with P fractional bits.

As an example, for a screen size of 1024×768, P=10 bits are used for both x and y, and the coefficients A and B should have at least ten fractional bits. Ten fractional bits may then be used for all three coefficients A, B, and C. Alternatively, 12 fractional bits may be used for these coefficients to achieve higher accuracy. In general, any number of fractional bits may be used for the coefficients A, B, and C depending on the desired accuracy of the final interpolated result for the attribute v. Different numbers of fractional bits may also be used for different attributes having different levels of sensitivity to errors. For example, more fractional bits may be used for attributes in which errors cause more visually noticeable artifacts, and fewer fractional bits may be used for attributes in which errors are relatively benign.

The number of integer bits for the coefficients A, B, and C may be reduced by exploiting the underlying geometry of triangle rendering for the attribute. The final result for an interpolated value for the attribute is constrained to be within a range specified by the number of bits (R) used for the attribute. For example, if the attribute has a 16.0 u format, then each interpolated value for the attribute is positive and is limited to within 16 integer bits. This means that even though the three terms $A_x$, $B_y$, and C on the right hand side of equation (1) may be negative and may even have more than 16 integer bits, the underlying geometry ensures that, after adding all of these three terms together, the final result on the left hand side will be positive and will have only 16 integer bits.

Figure 5:
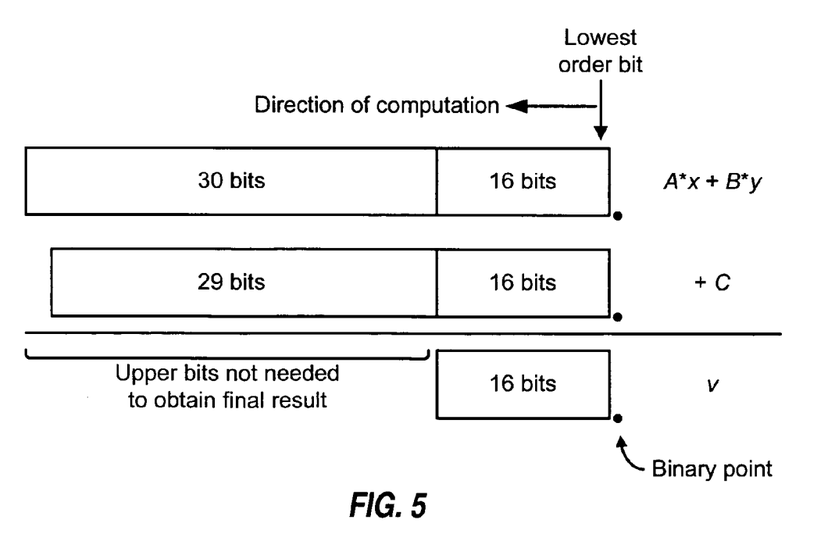
FIG. 5 illustrates use of underlying geometry to reduce the number of bits for the coefficients.

FIG. 5 illustrates the use of the underlying geometry to reduce the number of integer bits for the coefficients A, B, and C. For simplicity, the fractional bits to the right of the binary point are not shown in FIG. 5. For this example, M=12, F=6, the intermediate values $A_x$ and $B_y$ each have 45 integer bits, the sum of these two intermediate values has 46 integer bits, and the coefficient C has 45 integer bits. When interpolating between two points on a straight line, the interpolated value will have the same bitwidth as the two values at the two end points being interpolated. Thus, the interpolation for a 16-bit attribute produces a 16-bit interpolated value even if the intermediate values $A_x$ and $B_y$ and the coefficient C each have 45 bits.

The binary addition of 2's complement numbers (which is a format normally used to represent numbers in hardware) proceeds from right to left. To produce the lower 16 bits of the interpolated value for the attribute v, only the lower 16 bits of the quantities $A_x$, $B_y$, and C are needed. The upper 30 bits of the quantity $A_x+B_y$ and the upper 29 bits of the coefficient C are not needed and may be discarded. There is no loss in accuracy in the final result by discarding these upper bits.

Figure 6:
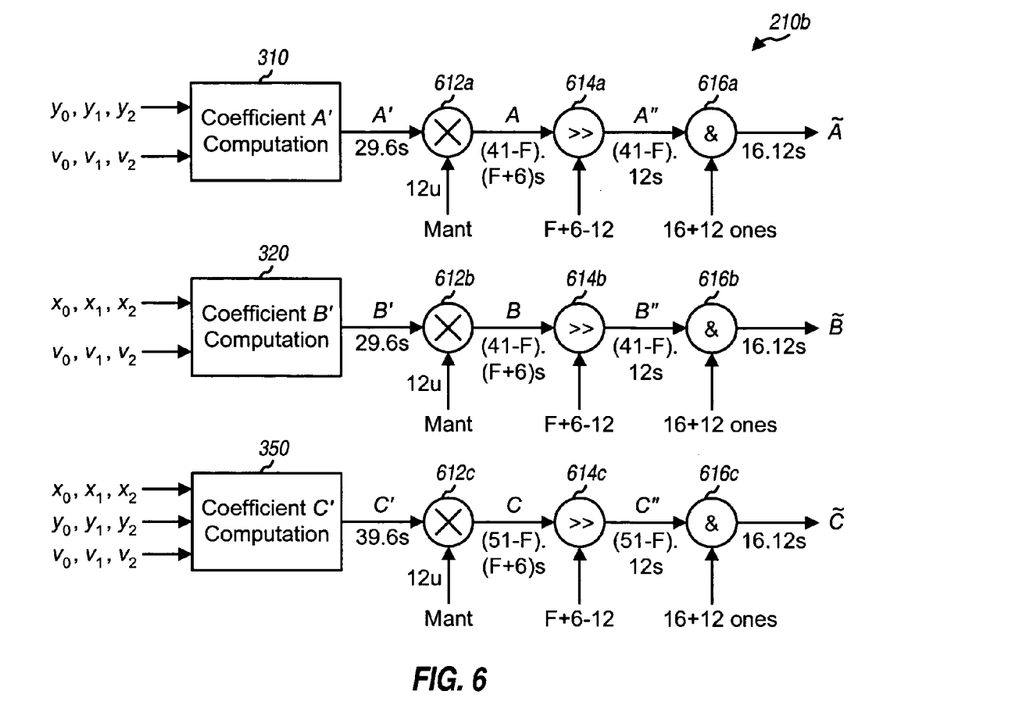
FIG. 6 shows a setup unit that generates the compressed coefficients for interpolation.

FIG. 6 shows the computation performed by a setup unit 210b to derive the compressed coefficients Ã, B̃, and C̃ having a fixed number of (R) integer bits and a fixed number of (T) fractional bits. Setup unit 210b is another embodiment of setup unit 210 in graphics engine 200 in FIG. 2. The intermediate coefficients A', B', and C' are computed based on the input parameters $\{x_i\}$ and $\{y_i\}$ in blocks 310, 320, and 350, respectively, which are described above in FIG. 3. The intermediate coefficients A', B', and C' are multiplied with the mantissa for the variable D in blocks 612a through 612c to generate the coefficients A, B, and C, respectively. The F+6−T rightmost bits of the coefficients A, B, and C are truncated in blocks 614a through 614c to generate coefficients A", B", and C", respectively, having T fractional bits. The truncation may be performed by shifting each of the coefficients A, B, and C to the right by F+6−T bits and discarding all F+6−T binary bits that are shifted out. The coefficients A", B", and C" each have T fractional bits after the truncation.

The coefficients A", B", and C" are then masked in blocks 616a through 6126c to retain R lower integer bits and T fractional bits. The masking may be achieved by performing a logical AND operation on each of the coefficients A", B", and C" with a mask composed of R+T ones for the R+T rightmost bit positions and zeros for all other bit positions. The coefficient bits corresponding to ones in the mask are retained and the coefficient bits corresponding to zeros in the mask are discarded. The mask operation on the coefficients A", B", and C" produces the compressed coefficients Ã, B̃, and C̃, respectively. Each of the compressed coefficients has an R.T format.

FIG. 6 also shows the bitwidths for various variables for the exemplary design shown in Table 1 with R=16 and T=12. The coefficients A and B each have 47 total bits of which F+6 are fractional bits, and the coefficient C has 57 total bits of which F+6 are fractional bits. For T=12, F+6−12 rightmost bits of the coefficients A, B, and C are truncated. The resultant coefficients A" and B" each have 53−F total bits of which 12 are fractional bits, and the coefficient C" has 63−F total bits of which 12 are fractional bits. The mask operation retains the 16 lower integer bits for the coefficients A", B", and C", discards all higher integer bits, and provides the compressed coefficients A, B, and C having 16 integer bits and 12 fractional bits.

Figure 7:
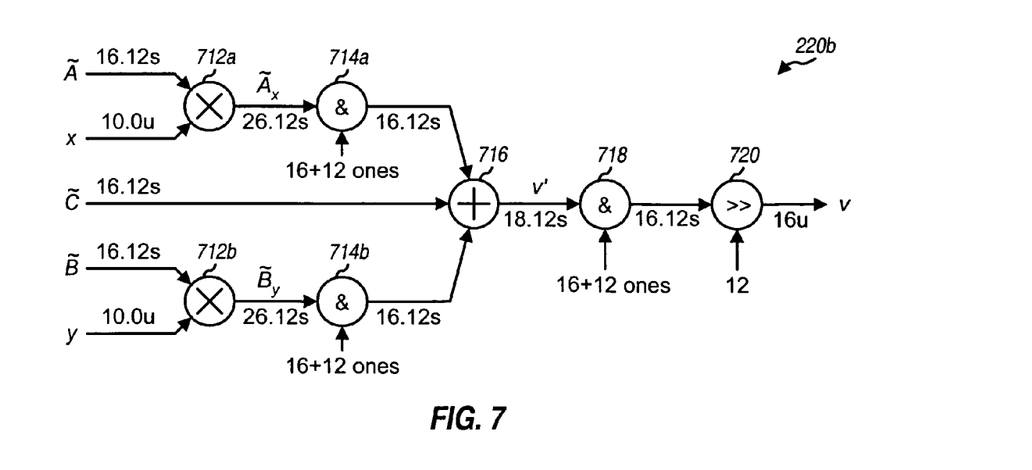
FIG. 7 shows a rendering unit that uses the compressed coefficients for interpolation.

FIG. 7 shows the computation performed by a rendering unit 220b to generate interpolated values for the attribute v using the compressed coefficients Ã, B̃, and C̃ derived by setup unit 210b in FIG. 6. Rendering unit 220b is another embodiment of rendering unit 220 in graphics engine 200 in FIG. 2. The variables x and y for a location to be interpolated are multiplied with the compressed coefficients Ã and B̃, respectively, in blocks 712a and 712b. The intermediate values $Ã_x$ and $B̃_y$ are masked in blocks 714a and 714b to retain only R lower integer bits and T fractional bits. The masked values are then summed with the compressed coefficient C̃ in block 716 to generate a preliminary result v' having R+2 integer bits and T fractional bits, with the two additional integer bits coming from the addition of three numbers. The preliminary result v' is masked in block 718 to retain only R lower integer bits and T fractional bits. The T fractional bits are truncated in block 720 to obtain the final interpolated result for the attribute v. FIG. 7 also shows the bitwidths for various variables for the exemplary design with R=16 and T=12.

The interpolation equation with the compressed coefficients may be expressed as:

$$v = \{[(Ã \cdot x) \text{AND Mask}] + [(B̃ \cdot y) \text{AND Mask}] + C̃\} \text{AND Mask}, \quad \text{Eq}$$

where Mask is a mask with (R+T) ones and the three AND operations in equation (12) reflect a non-saturating adder. All of the variables and coefficients in interpolation equation (12) are in fixed-point format. Equation (12) suggests that two multiplications are needed to produce each interpolated value. Since multiplications are more complex than additions, it is desirable to avoid or minimize the use of multiplications if possible.

Figure 8:
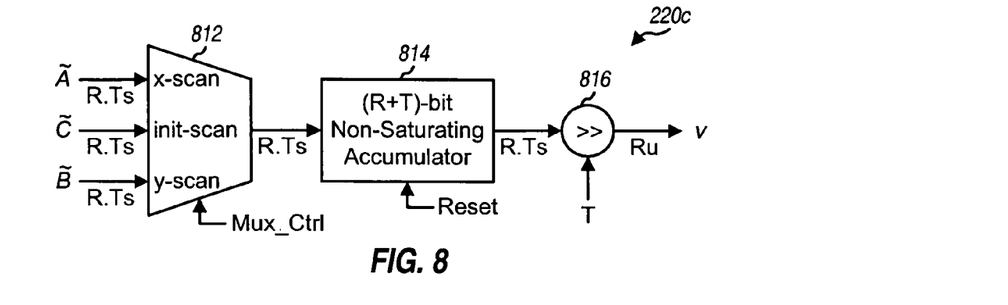
FIG. 8 shows a rendering unit that performs interpolation with non-saturating accumulation and without multiplication.

FIG. 8 shows a rendering unit 220c that can perform interpolation without any multiplication. Rendering unit 220c is yet another embodiment of rendering unit 220 in graphics engine 200 in FIG. 2. The compressed coefficients Ã, B̃, and C̃ are generated as described above and provided to a multiplexer 812, which also receives a Mux_Ctrl signal. Rendering unit 220c can render a triangle by scanning one line at a time, starting from the bottom of the triangle and going to the top of the triangle. At the start of the scan for each line, an (R+T)-bit non-saturating accumulator 814 is reset to zero by a Reset signal, multiplexer 812 provides the compressed coefficient C, and accumulator 814 stores the compressed coefficient C̃. For the scan of the first line, multiplexer 812 provides the coefficient Ã. For each pixel location on this line, accumulator 814 accumulates the coefficient Ã and provides an output having R integer bits and T fractional bits. A unit 816 truncates the T fractional bits in the accumulator output and provides the final interpolated value for the attribute v. Accumulator 814 provides an output for each pixel location on the line, and unit 816 provides a final interpolated value for each pixel location.

Accumulator 814 may be initialized for each line by evaluating equation (12) with x=0 and y=the line number. Multiplexer 812 provides the compressed coefficient B̃, and accumulator 814 accumulates in the vertical direction to get to the line being rendered. Multiplexer 812 then provides the compressed coefficient Ã. For each pixel location on the line being rendered, accumulator 814 accumulates the compressed coefficient Ã and provides its output to unit 816. Unit 816 truncates the accumulator output and provides the final interpolated value.

In general, multiplexer 812 and accumulator 814 may be operated to scan in the x-direction, the y-direction, or a combination of both directions. Accumulator 814 accumulates the output from multiplexer 812 and any overflow is ignored (hence the name "non-saturating" accumulator). The mask operation by block 718 in FIG. 7 is performed by the non-saturating accumulator.

Figure 9:
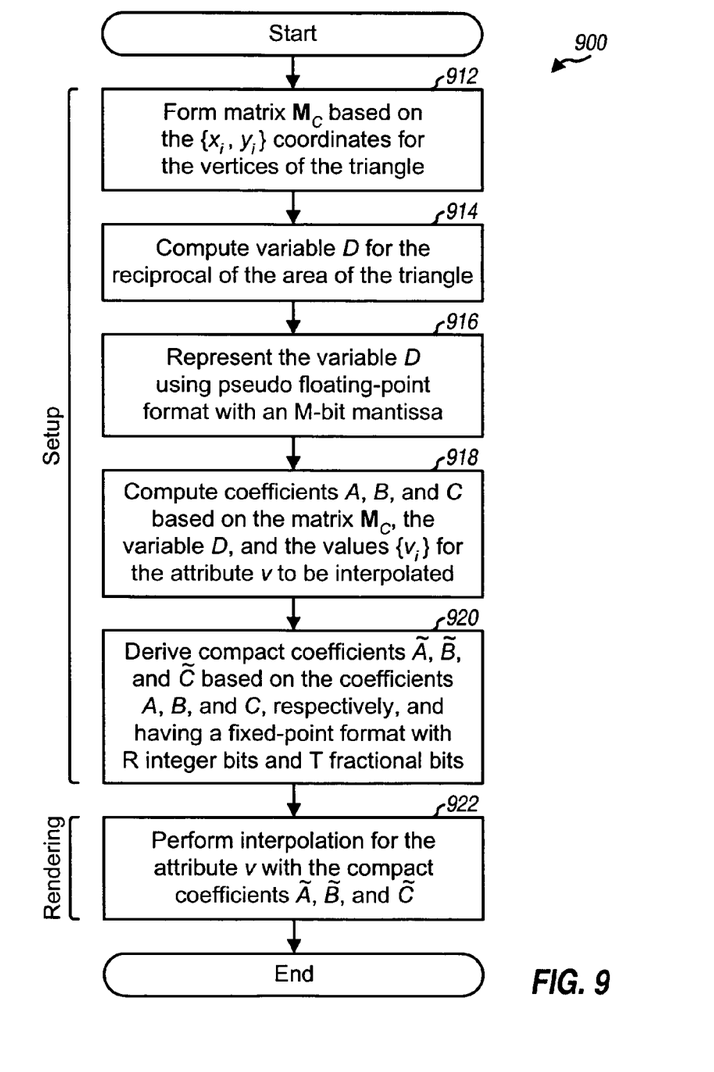
FIG. 9 shows a flow diagram of a process for rendering a triangle.

FIG. 9 shows a flow diagram of a process 900 for rendering a triangle. Initially, the companion matrix $M_C$ is formed based on the $\{x_i, y_i\}$ coordinates for the vertices of the triangle (block 912). The variable D for the reciprocal of the area of the triangle is computed (block 914). The variable D is then represented using the pseudo floating-point format with an M-bit mantissa having a value of "1" for the leftmost bit (block 916). The coefficients A, B, and C for the interpolation equation are then computed based on the companion matrix $M_C$, the mantissa for the variable D, and the values $\{v_i\}$ at the vertices of the triangle for the attribute v to be interpolated (block 918). The compressed coefficients A, B, and C are then derived based on the coefficients A, B, and C, respectively (block 920). The compressed coefficients Ã, B̃, and C̃ have a fixed-point format with R integer bits and T fractional bits. Interpolation is then performed for attribute v with the compressed coefficients Ã, B̃, and C̃ (block 922). Blocks 912 through 920 represent the setup stage for the triangle, and block 922 represents the rendering stage for the triangle.

In the description above, the compressed coefficients A, B, and C are computed with T fractional bits to handle the largest possible triangle for the display screen and with R integer bits to handle the entire dynamic range of the attribute being interpolated. In most instances, the triangle to be rendered is relatively small, and the attribute to be interpolated has a range of values that is much smaller than the full dynamic range for that attribute.

Furthermore, significant power savings may be realized by computing the compressed coefficients Ã, B̃, and C̃ with fewer fractional bits and/or fewer integer bits when not needed for the triangle and attribute to be rendered. The number of fractional bits (Tx) for the compressed coefficients may be selected based on the size of the triangle to be rendered and may be less than P. The number of binary bits (Rx) for the compressed coefficients may be selected based on the range of values for the attribute to be interpolated and may be less than R. The graphics engine may be implemented with R binary bits and T fractional bits, where T may be selected based on the screen size and R may be selected based on the full dynamic range of the attribute with the largest dynamic range, i.e., the most number of binary bits. When Tx for the triangle to be rendered is less than T, the (T−Tx) rightmost (or lesser significant) fractional bits may be set to zero. Similarly, when Rx for the attribute to be interpolated is less than R, the (R−Rx) leftmost (or more significant) binary bits may be set to zero. In hardware, power is typically consumed when bits are toggled. By setting bits that are not needed to zero, no power is consumed for these bits. Since the triangle size and the attribute range are both typically small, many fractional bits and binary bits may be set to zero, and significant power savings may be achieved. Furthermore, the same graphics engine may be used to render triangles of different sizes and attributes of different ranges (instead of having multiple graphics engines optimized for different triangle sizes and/or attribute ranges).

The graphics engine described herein is also highly reconfigurable. The compressed coefficients may be derived on the fly based on the dimensions of each triangle by simply changing the Mask of (R+T) ones.

The graphics engine and triangle rendering techniques described herein may be used for various devices, apparatuses, and electronics units. The triangle rendering techniques perform interpolation using fixed-point format, which is much more efficient in terms of complexity, power, die area, and cost than interpolation using floating-point format. The graphics engine and triangle rendering techniques described herein may thus be advantageously used for wireless and mobile platforms. Examples of such platforms include wireless communication devices (e.g., cellular phones), personal digital assistant (PDA), portable video gaming units, and so on.

Figure 10:
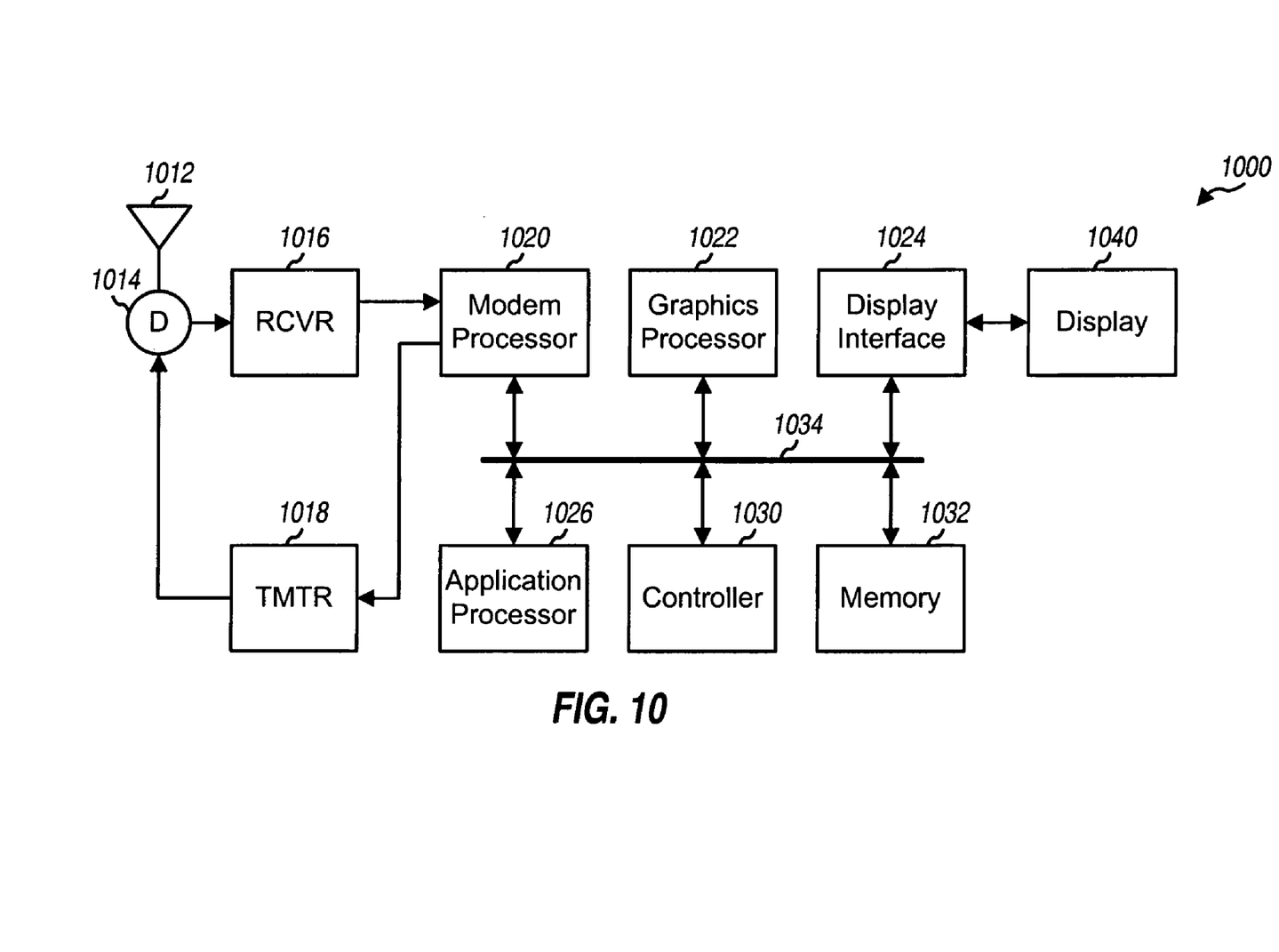
FIG. 10 shows a block diagram of a wireless device.

FIG. 10 shows a block diagram of a wireless device 1000 for a wireless communication system. Wireless device 1000 may be a cellular phone, a terminal, a handset, a PDA, or some other apparatus. The wireless communication system may be a Code Division Multiple Access (CDMA) system, a Global System for Mobile Communications (GSM) system, and so on. Wireless device 1000 is capable of providing bi-directional communication via a receive path and a transmit path.

For the receive path, signals transmitted by base stations in the system are received by an antenna 1012, routed through a duplexer (D) 1014, and provided to a receiver unit (RCVR) 1016. Receiver unit 1016 conditions and digitizes the received signal and provides input samples to a modem processor 1020 for further processing. For the transmit path, a transmitter unit (TMTR) 1018 receives data to be transmitted from modem processor 1020, processes and conditions the data, and generates a modulated signal, which is routed through duplexer 1014 and transmitted via antenna 1012 to the base stations.

Modem processor 1020 performs processing for data transmission and reception (e.g., encoding, modulation, demodulation, decoding, and so on). A graphics processor 1022 performs processing for graphics applications such as video games, 3-D avatars, and so on. Graphics processor 1022 may implement the graphics engine and triangle rendering techniques described above. A display interface unit 1024 performs certain post-processing tasks to facilitate the display of videos, graphics, texts, and so on, and further interfaces with a display unit 1040. Display unit 1040 may be any type of electronic display such as, e.g., thin film transistor (TFT), organic light emitting diode (OLED), cathode ray tube (CRT), and so on. An application processor 1026 performs processing for various applications such as, e.g., multi-way calls, web browsing, phone dialer application, media player, games, user interface and so on. A controller 1030 directs the operation of various processing units within wireless device 1000. A memory unit 1032 stores program code and data used by controller 1030 and other processing units. The various processing units may communicate via one or more buses 1034.

Wireless device 1000 may also include different and/or additional processors. For example, wireless device 1000 may include a video processor to process video content (e.g., still images, moving videos, moving texts, and so on) for video applications such as camcorder, video playback, video conferencing, and so on.

The graphics engine and triangle rendering techniques described herein can provide good interpolation results with reduced complexity. The interpolation coefficients can be represented using a compressed R.T fixed-point format with a fixed number of integer bits (due to the underlying geometry) and a fixed number of fractional bits (due to interpolation across a fixed-size screen). This compressed format reduces the size of the hardware elements (e.g., adders, accumulators, multiplexers, and so on) used in the graphics engine, particularly for the rendering stage. The fixed number of fractional bits effectively moves the variable truncation operation from the rendering stage (e.g., block 416 in FIG. 4) to the setup stage (e.g., blocks 614 in FIG. 6). Variable truncation is often implemented as a "barrel shifter", which shifts a number one bit at a time. Thus, variable truncation may consume considerably less power when implemented in the setup stage (which executes per triangle) instead of the rendering stage (which executes per pixel). The fixed truncation for the rendering stage may be efficiently implemented in hardware. The fixed number of integer bits also reduces computational complexity and further allows for implementation of the rendering stage with a simple non-saturating accumulator, as shown in FIG. 8.

The techniques described herein may also be used to render other polygons besides triangle. In general, the coefficients and interpolated values may be computed as described above. A check unit within the graphics engine determines whether each pixel is within the triangle or polygon to be rendered. The graphics engine provides the final interpolated values for pixels that fall within the triangle or polygon.

The triangle rendering techniques described herein may be implemented by various means. For example, these techniques may be implemented in hardware, software, or a combination thereof. For a hardware implementation, the processing units used to render triangles may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For a software implementation, triangle rendering may be implemented with modules (e.g., procedures, functions, and so on) that perform the functions described herein. The software codes may be stored in a memory unit (e.g., memory unit 1032 in FIG. 10) and executed by a processor (e.g., controller 1030). The memory unit may be implemented within the processor or external to the processor, in which case it can be communicatively coupled to the processor via various means as is known in the art. For a hardware and software implementation, the setup stage may be performed in software, and the rendering stage may be performed in hardware.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A graphics processor comprising:
    a setup unit operative to compute a first set of coefficients used to perform interpolation for rendering a polygon and to derive a second set of coefficients based on the first set of coefficients, each coefficient in the second set being derived based on, and having fewer bits than, a corresponding coefficient in the first set, each coefficient in the second set having a fixed-point format with R integer bits left of a binary point and T fractional bits right of the binary point, where R is greater than one and T is zero or greater; and
    a rendering unit operative to perform interpolation with the second set of coefficients to render the polygon.

2. The graphics processor of claim 1, wherein the setup unit is operative to
    form a matrix $M_C$ based on coordinates for vertices of the polygon,
    derive a variable D indicative of a reciprocal of an area of the polygon, and
    compute the first set of coefficients based on the matrix $M_C$, the variable D, and values at the vertices of the polygon for an attribute to be interpolated.

3. The graphics processor of claim 2, wherein the setup unit is operative to represent elements of the matrix $M_C$ with a fixed-point format and to represent the variable D with a pseudo floating-point format.

4. The graphics processor of claim 3, wherein the setup unit is operative to represent a mantissa for the variable D with M bits, where M is greater than one and a leftmost bit for the mantissa has a value of one.

5. The graphics processor of claim 4, wherein the setup unit is operative to select M based on desired accuracy for interpolated results.

6. The graphics processor of claim 4, wherein M is 12 or greater.

7. The graphics processor of claim 1, wherein the setup unit is operative to compute the first set of coefficients for an attribute to be interpolated.

8. The graphics processor of claim 1, wherein the setup unit is operative to derive the second set of coefficients further based on dimensions of the polygon to be rendered.

9. The graphics processor of claim 7, wherein the setup unit is operative to determine R based on number of integer bits used for the attribute.

10. The graphics processor of claim 7, wherein the setup unit is operative to determine R based on a range of values for the attribute across the polygon.

11. The graphics processor of claim 10, wherein upper more significant binary bits supported by the graphics processor but not used for the attribute are set to zero.

12. The graphics processor of claim 1, wherein the setup unit is operative to determine T based on number of bits used for horizontal and vertical dimensions of a display screen for which the polygon is rendered.

13. The graphics processor of claim 1, wherein the setup unit is operative to determine T based on size of the polygon, where T is less than the number of bits used for horizontal and vertical dimensions of a display screen for which the polygon is rendered.

14. The graphics processor of claim 13, wherein lower lesser significant fractional bits supported by the graphics processor but not used for the polygon are set to zero.

15. The graphics processor of claim 1, wherein the setup unit is operative to derive the second set of coefficients further based on the rendering unit performing linear interpolation using twos complement addition.

16. The graphics processor of claim 1, wherein the rendering unit is operative to perform interpolation based on the following equation:

$$v = \{[(\tilde{A} \cdot x) \text{AND Mask}] + [(\tilde{B} \cdot y) \text{AND Mask}] + \tilde{C}\} \text{AND Mask},$$

where $\tilde{A}$, $\tilde{B}$, and $\tilde{C}$ are the coefficients in the second set;
    x and y are coordinates for a location within the polygon;
    Mask is a mask with a predetermined number of ones; and
    v is an interpolated value at the (x, y) coordinates.

17. The graphics processor of claim 16, wherein the rendering unit comprises a non-saturating accumulator operative to accumulate the coefficient $\tilde{A}$ to interpolate across a horizontal direction and to accumulate the coefficient $\tilde{B}$ to interpolate across a vertical direction.

18. A method of performing interpolation for rendering a polygon, comprising:
    computing a first set of coefficients used to perform interpolation;
    deriving a second set of coefficients based on the first set of coefficients, each coefficient in the second set being derived based on, and having fewer bits than, a corresponding coefficient in the first set, each coefficient in the second set having a fixed-point format with R integer bits left of a binary point and T fractional bits right of the binary point, where R is greater than one and T is zero or greater; and
    performing interpolation with the second set of coefficients to render the polygon.

19. The method of claim 18, wherein the first set of coefficients is computed for an attribute to be interpolated, and wherein R is determined based on a number of integer bits used for the attribute.

20. The method of claim 18, wherein T is determined based on number of bits used for horizontal and vertical dimensions of a display screen for which the polygon is rendered.

21. The method of claim 18, wherein the interpolation is performed based on the following equation:

$$v = \{[(\tilde{A} \cdot x) \text{AND Mask}] + [(\tilde{B} \cdot y) \text{AND Mask}] + \tilde{C}\} \text{AND Mask},$$

where $\tilde{A}$, $\tilde{B}$, and $\tilde{C}$ are the coefficients in the second set;
    x and y are coordinates for a location within the polygon;
    Mask is a mask with a predetermined number of ones; and
    v is an interpolated value at the (x, y) coordinates.

22. The method of claim 21, wherein the performing interpolation comprises:
    performing non-saturating accumulation of the coefficient $\tilde{A}$ to interpolate across a horizontal direction, and
    performing non-saturating accumulation of the coefficient $\tilde{B}$ to interpolate across a vertical direction.

23. An apparatus comprising:
    means for computing a first set of coefficients used to perform interpolation for rendering a polygon;
    means for deriving a second set of coefficients based on the first set of coefficients, each coefficient in the second set being derived based on, and having fewer bits than, a corresponding coefficient in the first set, each coefficient in the second set having a fixed-point format with R integer bits left of a binary point and T fractional bits right of the binary point, where R is greater than one and T is zero or greater; and
    means for performing interpolation with the second set of coefficients to render the polygon.

24. The apparatus of claim 23, wherein the first set of coefficients is computed for an attribute to be interpolated, and wherein R is determined based on a number of integer bits used for the attribute.

25. The apparatus of claim 23, wherein T is determined based on number of bits used for horizontal and vertical dimensions of a display screen for which the polygon is rendered.

26. The apparatus of claim 23, wherein the interpolation is performed based on the following equation:

$$v=\{[(\tilde{A}\cdot x)\text{AND Mask}]+[(\tilde{B}\cdot y)\text{AND Mask}]+\tilde{C}\}\text{AND Mask},$$

where $\tilde{A}$, $\tilde{B}$, and $\tilde{C}$ are the coefficients in the second set;
x and y are coordinates for a location within the polygon;
Mask is a mask with a predetermined number of ones; and
v is an interpolated value at the (x, y) coordinates.

27. The apparatus of claim 26, wherein the means for performing interpolation comprises:
means for performing non-saturating accumulation of the coefficient $\tilde{A}$ to interpolate across a horizontal direction, and
means for performing non-saturating accumulation of the coefficient $\tilde{B}$ to interpolate across a vertical direction.

28. A portable device comprising:
a graphics processor comprising
a setup unit operative to compute a first set of coefficients used to perform interpolation for rendering a polygon and to derive a second set of coefficients based on the first set of coefficients, each coefficient in the second set being derived based on, and having fewer bits than, a corresponding coefficient in the first set, each coefficient in the second set having a fixed-point format with R integer bits left of a binary point and T fractional bits right of the binary point, where R is greater than one and T is zero or greater, and
a rendering unit operative to perform interpolation with the second set of coefficients to render the polygon; and
a controller operative to direct operation of the graphics processor.

29. The portable device of claim 28 and operable to provide communication via a wireless communication system.

30. A computer-readable medium storing code for causing a computer to perform interpolation for rendering a polygon, comprising:
code for causing a computer to compute a first set of coefficients used to perform interpolation;
code for causing a computer to derive a second set of coefficients based on the first set of coefficients, each coefficient in the second set being derived based on, and having fewer bits than, a corresponding coefficient in the first set, each coefficient in the second set having a fixed-point format with R integer bits left of a binary point and T fractional bits right of the binary point, where R is greater than one and T is zero or greater; and
code for causing a computer to perform interpolation with the second set of coefficients to render the polygon.

31. The computer-readable medium of claim 30, wherein the first set of coefficients is computed for. an attribute to be interpolated, and wherein R is determined based on a number of integer bits use for the attribute.

32. The computer-readable medium of claim 30, wherein T is determined based on number of bits used for horizontal and vertical dimensions of a display screen for which the polygon is rendered.

33. The computer-readable medium of claim 30, wherein the interpolation is performed based on the following equation:

$$v=\{[(\tilde{A}\cdot x)\text{AND Mask}]+[(\tilde{B}\cdot y)\text{AND Mask}]+\tilde{C}\}\text{AND Mask},$$

where $\tilde{A}$, $\tilde{B}$, and $\tilde{C}$ are the coefficients in the second set;
x and y are coordinates for a location within the polygon;
Mask is a mask with a predetermined number of ones; and
v is an interpolated value at the (x, y) coordinates.

34. The computer-readable medium of claim 33, wherein the code for causing a computer to perform interpolation comprises:
code for causing a computer to perform non-saturating accumulation of the coefficient $\tilde{A}$ to interpolate across a horizontal direction, and
code for causing a computer to perform non-saturating accumulation of the coefficient $\tilde{B}$ to interpolate across a vertical direction.

* * * * *